Feb. 3, 1953  S. PRZYBOROWSKI  2,627,241
APPARATUS FOR MAKING TUBULAR RADIATOR CORES
Filed Dec. 30, 1948  3 Sheets-Sheet 1

Inventor
Stanislaus Przyborowski,
By Albert R. Henry
Attorney

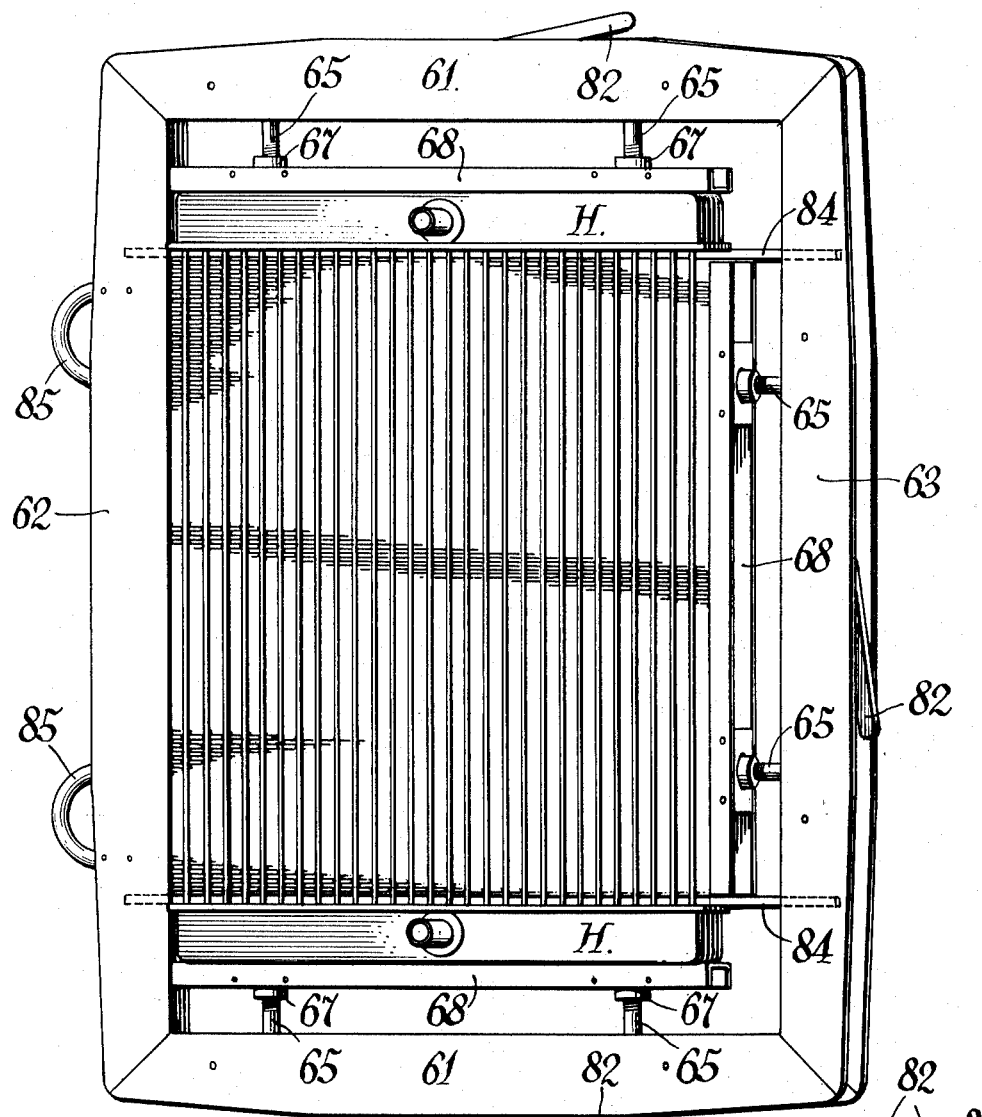
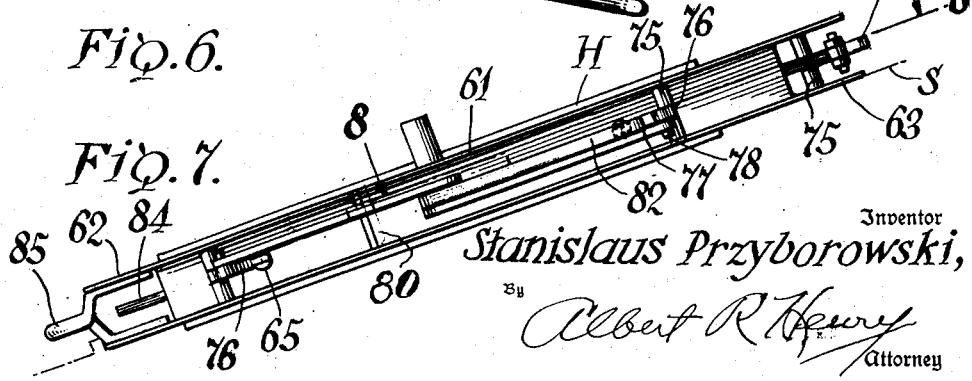

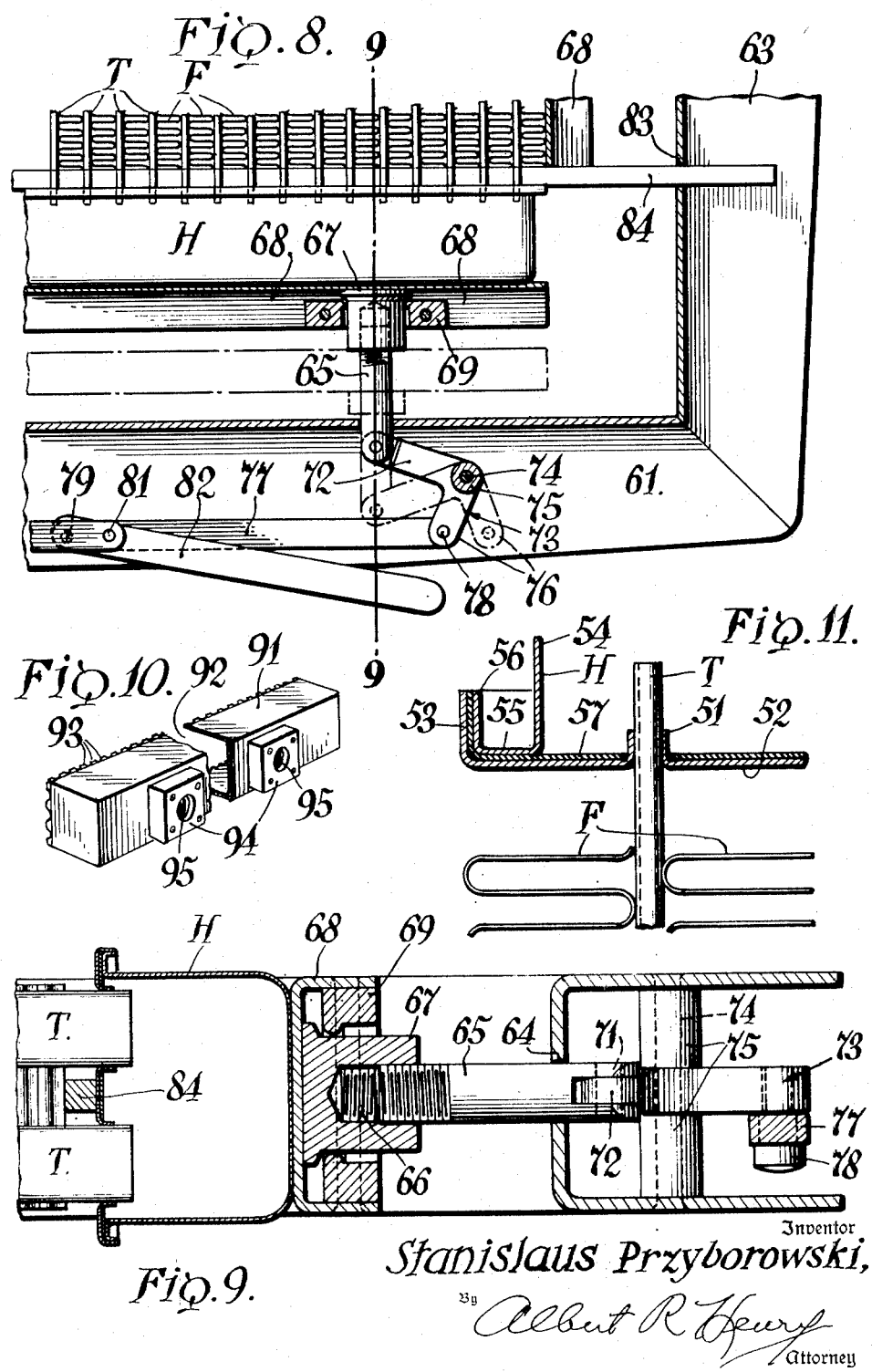

Patented Feb. 3, 1953

2,627,241

UNITED STATES PATENT OFFICE 2,627,241

APPARATUS FOR MAKING TUBULAR RADIATOR CORES

Stanislaus Przyborowski, Kenmore, N. Y., assignor to Fedders-Quigan Corporation, Buffalo, N. Y., a corporation of New York Application December 30, 1948, Serial No. 68,294

1 Claim. (Cl. 113—102)

This invention relates to apparatus for making a tubular radiator core, and it has particular reference to the provision of improved and leak resistant header constructions for such cores, and to apparatus by means of which the core elements may be properly assembled for simultaneous integration.

One of the problems presented in the manufacture of tubular radiator cores has been the mass production of these articles with a minimum of defective units. The ends of the tubes must be sealed into the header plates, and the plates in turn must be sealed to tanks, in a manner rendering the joints leakproof under internal hydraulic pressures. Heretofore, it has been considered essential to the production of cores free from leaks that various joints should be soldered by hand. Thus, the tubes and fins were integrated to each other by a baking operation, causing the solder coating on the tubes to bond to the contacting fins. If less than perfection was achieved, that result was not too serious, inasmuch as the joints between fins and tubes were impervious at the outset.

On the other hand, the joints between the header plates and header tanks and tubes have to be liquid tight, as otherwise the cooling liquid circulating in the core will leak out, and the radiator is thereupon rendered practically worthless. Hence, this more delicate and essential bonding operation has, to a large extent, been a matter of hand finishing, in which skilled workmen would solder each core separately. Such practice has, of course, resulted in high production costs.

According to the present invention, it is proposed to bond the header tanks to the header plates, and the plates to the tube ends, at the same time that the tubes and fins are united to each other, and thus eliminate a substantial proportion of the hand assembly operations heretofore deemed necessary. This result is made possible by the conjoint use of a novel header plate and tank formation, and an assembly frame or fixture which clamps the headers to the unbonded tube and fins in such fashion that subsequent heat treatment bonds all of the parts together. Provision is also made for the hand finishing, in an expeditious manner, of the irreducible number of cores which exhibit leaks, so that it is unnecessary to dismantle and rework a core which is more or less defective.

The invention will be readily understood from the following description of practical embodiments thereof, illustrated in the accompanying drawings, wherein.

Figure 3:
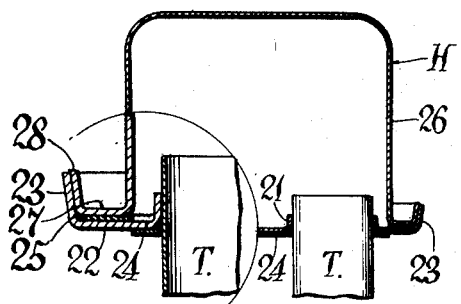
Figure 4:
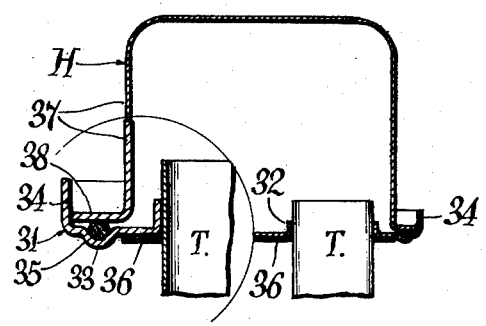
Figure 5:
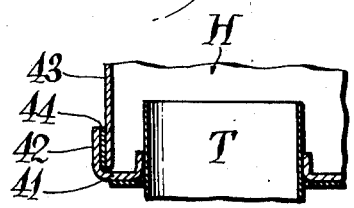

Figs. 3, 4, and 5 are fragmentary sections through header tank and plate joints;

Fig. 6 is a top plan of an assembly frame with the components of the core positioned therein, the assembly being inclined to the plane of the paper;

Fig. 7 is an end elevation of the assembly frame, further showing it in its inclined position employed during core assembly;

Fig. 8 is an enlarged fragmentary section taken substantially on the line 8—8 of Fig. 7;

Fig. 9 is an additionally enlarged fragmentary section taken substantially on the line 9—9 of Fig. 8;

Fig. 10 is a perspective of a header tank pressure shoe which may be included in the assembly frame; and, Fig. 11 is an enlarged fragmentary section through a header tank and plate joint, looking at right angles to the views of Figs. 3, 4, and 5.

Figure 1:
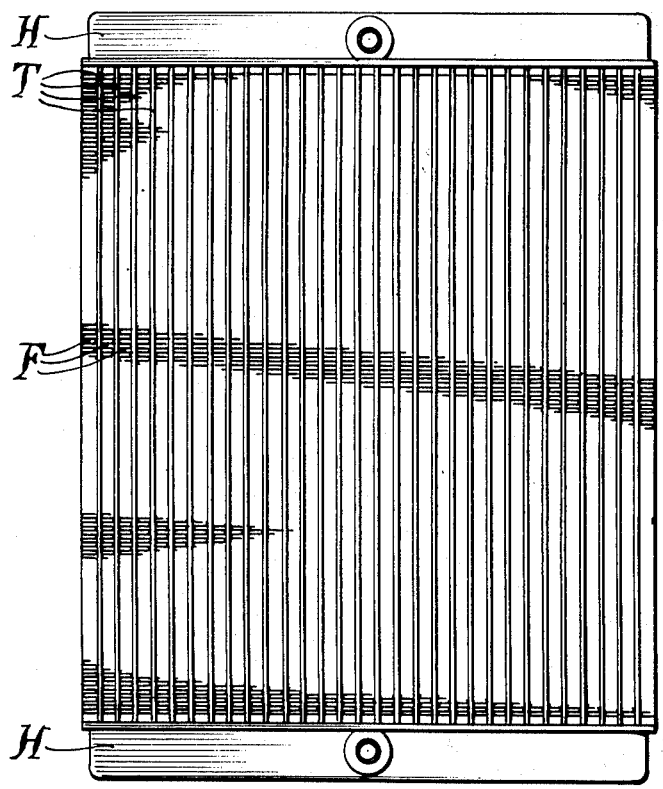
Fig. 1 is a face elevation of a typical tubular radiator embodying the structure of the present invention.
Figure 2:
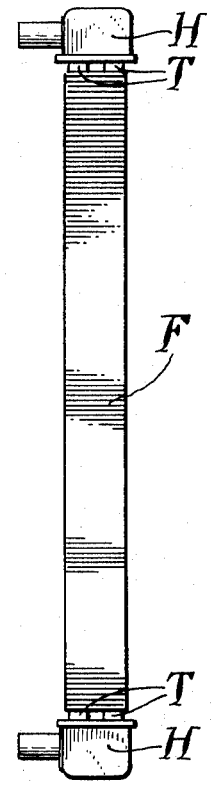
Fig. 2 is a side elevation thereof.

The radiator core shown in Figs. 1 and 2 includes, in common with known cores, spaced headers H between which extend a plurality of tubes T, arranged in rows both in depth and across the face of the core. Heat radiating fins F are disposed transversely of the tubes and are bonded thereto along the side walls thereof, to provide air passageways by means of which liquid circulating through the headers and tubes may be cooled. The fins F are herein illustrated as being in the form of pleated or corrugated continuous ribbons of sheet metal, but it should be understood that punched transverse type of fin may also be employed without departure from many aspects of the invention.

As heretofore noted, it has long been common practice to assemble the tubes and fins in a nest or holding frame, and subject this assembly to a high temperature to melt a coating of solder on the tubes, and thereby bond the fins and tubes together. The headers H were then connected by a subsequent operation. According to the present invention, a header construction is provided, of such nature that it becomes feasible to assemble the headers with the unbaked fins and tubes, and bond the entire structure at one operation with a minimum of resulting defective units.

One form of header construction is shown in Fig. 3, the left hand side of the view being drawn as though under a magnifying glass, the better to illustrate the construction. The ends of the tubes T extend through flanged openings 21 formed in header plates 22, and the header plates are formed with an upturned marginal flange 23. During the course of assembly, a sheet of solder 24, which is punched with elongated openings to receive the tube ends, is laid on the outside or unflanged side of the header plate 22, and a strip or band of solder ribbon 25 is laid on the flanged side of the header plate, adjacent the flange 23. A sheet metal drawn shell or header tank 26, formed with an outstanding flange 27 and an upturned flange 28, is then positioned on the header plate to cover the ends of the tubes T.

The flange 27 rests upon the solder ribbon 25, and the flanges 23 and 28 abut each other with a tight contact. This contact is made more positive by tapering or imparting a slight draft to the flanges 23 and 28, so that, when the tank 26 is pressed into assembled position, the flanges engage with a mild wedging action between them. Upon subjecting the core to a temperature sufficient to melt the solder, the sheet 24 flows into the joints between the tubes and flanged openings 21, while the band 25 flows into the joint between the flanges 23 and 28, as well as into the joint between the flange 27 and the face of the plate 22. The parts are thereby bonded to each other.

It should be noted that the experience of the art has been that the best joints are made when the melting solder can flow into a joint of capillary dimension, into which it will be drawn by surface tension effects. Radiator cores are subjected to severe vibrations when in service on an automobile, and these mechanical forces tend to disrupt joints which are good by the criterion of initial tight fit and capillary flow. For a strong joint, it is desirable that the solder should resist the vibrational forces in shear, rather than mere tension, as the shear resistance, other things being equal, is greater than the tensile strength. It will be seen that the joint illustrated in Fig. 3 is such, by reason of the parallel flanges 23 and 28, as to resist strains in shear; and accordingly the joint is good, both as to continuity and to strength.

A slightly modified header joint is illustrated in Fig. 4, the left hand portion again being shown as under magnification. A header plate 31, formed with flanged tube receiving openings 32, is also formed with a marginal depressed groove or bead 33 and an upturned flange 34. The groove 33 is adapted to receive a solder wire 35, and a punched sheet of solder 36 is positioned on the outer surface of the header plate, as previously described. A header tank 37, formed with an outstanding marginal flange 38, is positioned over the plate 31, and is pressed against the wire 35, and thereafter the assembly is baked to melt the solder and integrate the core. The flange 34 may be given a slight draft, so as to have tight abutting engagement with the edge of the flange 38, and thereby provide a joint having a positive shear resistance.

The modified joint shown in Fig. 5 comprises a tube receiving header plate 41 having an upturned marginal flange 42 which is adapted to abut the side wall of a header tank 43 through an interposed layer of solder 44. It will be apparent from what has been stated before that, upon the fusing of the solder, a good strong joint may be obtained.

Reference at this point may be made to the header construction shown in Fig. 11. The tubes T enter flanged openings 51 formed in a header plate 52 which has an upturned marginal flange 53. The flange 53 is shown as being substantially at right angles to the plane of the plate, but it will be understood that it may have a slight draft or inclination, as was considered in connection with Fig. 3. The header tank 54 is formed with outstanding and upturned marginal flanges 55 and 56 respectively. A sheet of solder 57 is formed with openings to fit over the flanged openings 51, and it is sufficiently extensive to underlie the flange 55 and to enter the crevice between the flanges 53 and 56. It will be noted that the joint between the header plate and the header tank will be sealed according to the principles heretofore set forth. It has been found that the solder surrounding the flanged opening 51 will also flow over the edges thereof, and thus seal the joints between the tubes T and the header plate.

A suitable assembly frame for bringing the core components together, and holding them under pressure while they undergo the necessary heat treatment, is illustrated in the remaining views of the drawings. The frame comprises end channel members 61 and side channels 62 and 63 which are beveled at their ends and are welded together to form a rectilinear open body. Each of the end walls 61 and one side wall 63 are provided with apertures 64, through which extend clamping plungers 65. The inner ends of the plungers are threaded to fit into tapped openings 66 in adapter shoes 67, the ends of which abut the webs of channel bars 68. Perforated retainers 69, which are pinned to the flanges of the channels 68, surround the enlarged ends of the shoes 67 and prevent them from becoming detached, while allowing a certain measure of lost and tilting motion.

The outer end of each of the plungers 65 is formed with a clevis 71, in which is pivotally connected the end of one arm 72 of a bell crank lever 73, whose fixed fulcrum is provided by a pin 74 extending between the channel webs. Spacing washers 75 serve to align the levers and plungers with respect to the frame. The end of the other arm 76 of the bell crank lever is pivotally connected to one end of a link 77 by means of a rivet 78. The links 77 extend toward each other, and they are respectively connected, at their adjacent ends, by pins 79 and 81 to spaced points on the end of a handle lever 82.

When the handle 82 is swung in one direction, as away from the channel frame members, the links 77 will be moved linearly in opposite directions, thereby swinging the arms 76 of the bell crank levers of each pair in opposite rotative directions. This motion will cause an outward movement of the plungers 65 to pull the end channel bars 68 away from each other, and to move the channel bar 68 along the side frame section 63 away from the opposite side 62. Slight eccentricities are accommodated by the loose fit between the plunger shoes 67 and retainers 69, and the motion of the bars is, for all practical purposes, substantially straight line motion in a direction at right angles to the length of the bars 68. It will be seen that operation of the handles 82 either increases or decreases the open area within the frame. The links may be guided by fixed pins 80 working in elongated slots.

The side channels 62 and 63 are additionally formed with pairs of aligned openings 83, through which may be positioned detachable rods 84. These are so located that, upon assembling the core components, the rods 84 serve as abutments and supports for the outer or unflanged surfaces of the header plates included in the core assembly. The side channel 62 is also advantageously provided with bails 85, by means of which the frame and core assembly may be caught up by a conveyor for delivery to the baking oven.

In assembling a core in the frame, the frame is laid flat on an inclined support S, indicated schematically by the dot and dash line in Fig. 7. The bars 84 are positioned, and they are, of course, spaced from each other in parallelism a distance commensurate with the length of the core to be made. One may then proceed to position the header plates of any of the described embodiments against the rods 84, and hold them frictionally in position by any suitably sized block fitted between the flanged surfaces of the plates and the bars 68.

Alternatively, the header plates and tanks, together with the solder sheets or strips, may be mechanically assembled, and the subassembly then pressed against the rods 84 by manipulation of the handles 82, to press the bars 68 against the end surfaces of the tanks H. In this connection, attention is invited to the pressure shoe shown in Fig. 10, the illustration of which has not been repeated in the remaining views for purposes of clarity. This shoe comprises a generally rectilinear box 91 having an open end 92, the margins of which are scalloped or formed with a series of protruding fingers 93. The opposite end of the box is provided with a pair of detachable pads 94, each of which is formed with an aperture 95.

In use, a box 91 may be connected directly to the inner surface of each of the end bars 68, by any suitable means not shown, or the bars 68 may be detached and the shoes 67 fitted into the apertures of the pads 94. The box 91 is of a suitable size to receive the header tank H, with the fingers 93 engaging the outstanding flanged portion thereof. These fingers therefore press the flanged portion of the header tank tightly against the header plate itself, and the solder which may be interposed therebetween, and so serve to enhance the tightness of the joint. The scalloping of the box edges permits the heat to penetrate more rapidly than would be the case if continuous straight edges were employed.

In either case, after the header plates have been secured against the rods 84, a strip of fin ribbon F is placed against the inner surface of the lower channel 62, being retained between the rods 84 and the surface of the support S. A pair of tubes T are then pushed through their respective apertures in the lower part of the headers, by endwise movement, and then another strip of fin stock is laid on the first row of tubes. This process of alternately inserting layers of fin ribbon and lengths of tubing is continued until a core of requisite width is produced.

The ribbons may then be tapped or pressed lightly to make sure that they are all at the proper elevation, and the handle 82 on the upper frame side 63 is then swung to clamp the fins and tubes tightly together. Prior to effecting this operation, the end handles 82 may be backed away from full locking position, so that the core elements may orient themselves correctly. If the end tanks have already been positioned, the release of the end handles provides an opportunity for a final inspection of the header joints, before the end clamps are again positioned. If the end tanks have not previously been positioned, they are then moved into place and clamped. The handles 82 may be retained in closed position by any suitable means, not shown, such as encircling bands. The core and frame may then be transferred by the bails 85 to the baking oven, and a new frame placed on the support for fabricating another core.

It will be noted that the rods 84 not only provide a pressure pad or support for the header plates, but they also serve to space the fins F slightly therefrom, as is clearly shown in Figs. 8, 9, and 11. Due to irreducible errors which will occur in any mass production assembly practice, such, for example, as imperfect cleaning and fluxing, or undetected irregularities in the metal surfaces, a certain random number of the multitudinous joints will not be perfectly sealed. There may be a faulty joint between a tube and its flanged opening, or a slight leak along a flange margin, which will be located when the baked core is submerged in a water tank and tested with air under pressure. The spacing of the fins F from the header plates permits a workman to reach in with a soldering tool to correct the defect, without burning or otherwise damaging the core in its entirety.

It will accordingly be seen that the invention provides a radiator core having an improved header joint, and one which lends itself to the simultaneous bonding of the header tank with the integration of the remaining core elements, thereby greatly reducing the time and labor required to fabricate the core. The invention moreover provides an improved assembly fixture or holding frame, which may be employed to organize the core elements in proper relation, and retain them in position while undergoing heat treatment. While the invention has been described with respect to particular embodiments, it is of course intended that these should be considered as illustrative, and that the invention should not be limited to less than is encompassed by the scope of the following claim.

I claim:

An assembly frame for radiator cores comprising an open body having opposed side and end rails, pairs of aligned apertures formed in the side rails adjacent the end rails, supporting rods extending in parallelism to the end rails and between said apertures and removable axially therethrough, said supporting rods having opposed plane faces between the side rails facing toward and away from the end rails, a pressure bar mounted on one side of the body between said apertures therein and within the opening of the frame, operating mechanism connected to the pressure bar and to the frame for moving said pressure bar toward and away from the opposite side rail, said pressure bar being adapted to clamp a plurality of water passage elements and fin elements within the frame, additional pressure bars mounted within the frame opening adjacent said end rails and between said end rails and said pairs of apertures, and mechanism connected to said additional pressure bars and said frame for moving the additional pressure bars linearly toward and away from each other, whereby said additional pressure bars may clamp header members to the water passage and fin elements retained in the frame by said first named pressure bar, said supporting rods being supported on said side rails adjacent said apertures.

STANISLAUS PRZYBOROWSKI.

REFERENCES CITED

The following references are of record in the file of this patent:

UNITED STATES PATENTS

| Number | Name | Date |
|---|---|---|
| 704,553 | Lindstrom | July 15, 1902 |
| 1,025,898 | Beebe | May 7, 1912 |
| 1,049,940 | Streichert | Jan. 7, 1913 |
| 1,301,793 | Spery | Apr. 22, 1919 |
| 1,685,244 | Rosensweig | Sept. 25, 1928 |
| 1,760,505 | Lea | May 27, 1930 |
| 1,772,514 | Hoogerhyde | Aug. 12, 1930 |
| 1,852,180 | McKnight et al. | Apr. 5, 1932 |
| 1,959,464 | Dryden | May 22, 1934 |
| 2,127,828 | Milton | Aug. 23, 1938 |
| 2,212,421 | Henderson | Aug. 20, 1940 |
| 2,277,631 | Bullock | Mar. 24, 1942 |
| 2,356,919 | Dono et al. | Aug. 29, 1944 |
| 2,381,584 | Fulleton | Aug. 7, 1945 |
| 2,473,561 | Balmer | June 21, 1949 |